(12) United States Patent
Cartechini (10) Patent No.: US 10,066,365 B2
(45) Date of Patent: Sep. 4, 2018

(54) PUBLIC WORKS VEHICLE PROVIDED WITH COUNTERWEIGHT LIFTING SYSTEM

(71) Applicant: HPM-HYDRAULIC PERFORMANCE MACHINES SRL, Recanati (IT)

(72) Inventor: Giuseppe Cartechini, Recanati (IT)

(73) Assignee: HPM—HYDRAULIC PERFORMANCE MACHINES SRL, Recanati, (MC) (IT)

( * ) Notice: Subject to any disclaimer, the term of this patent is extended or adjusted under 35 U.S.C. 154(b) by 30 days.

(21) Appl. No.: 15/411,507

(22) Filed: Jan. 20, 2017

(65) Prior Publication Data

US 2017/0210432 A1 Jul. 27, 2017

(30) Foreign Application Priority Data

Jan. 22, 2016 (IT) .................. 102016000006573

(51) Int. Cl.

| E02F 9/18 | (2006.01) |
|---|---|
| B62D 49/08 | (2006.01) |
| E21B 7/02 | (2006.01) |
| B66C 23/72 | (2006.01) |
| B66C 23/74 | (2006.01) |
| B66C 23/76 | (2006.01) |

(52) U.S. Cl.
CPC .............. *E02F 9/18* (2013.01); *B62D 49/085* (2013.01); *B66C 23/72* (2013.01); *B66C 23/74* (2013.01); *B66C 23/76* (2013.01); *E21B 7/02* (2013.01)

(58) Field of Classification Search
CPC ......... B62D 49/08; B62D 49/085; E21B 7/02; E02F 9/18
See application file for complete search history.

(56) References Cited

U.S. PATENT DOCUMENTS

| 2,891,681 | A | * | 6/1959 | Greivell | ............... | B62D 49/085 |
|---|---|---|---|---|---|---|
| | | | | | | 212/196 |
| 3,902,735 | A | * | 9/1975 | Bertram | .................... | E02F 9/18 |
| | | | | | | 280/759 |
| 4,067,415 | A | * | 1/1978 | Samide | ................ | B62D 49/085 |
| | | | | | | 187/222 |
| 4,437,701 | A | * | 3/1984 | Mizelle | .................. | A47C 1/034 |
| | | | | | | 297/267.1 |

(Continued)

FOREIGN PATENT DOCUMENTS

| CA | 2224703 | * | 1/1997 | | |
|---|---|---|---|---|---|
| DE | 3607257 A1 | * | 9/1987 | ........... | A01B 59/004 |

(Continued)

*Primary Examiner* — Nicole T Verley
(74) *Attorney, Agent, or Firm* — Egbert Law Offices, PLLC (57) ABSTRACT

A public works vehicle has a base, moving means supporting the base, brackets joined to the frame of the base, a lifting system suitable for lifting a counterweight. The lifting system has a first arm hinged to the frame, at least one thrust actuator connected to the frame and to the first arm to move the first arm, a second arm slidingly mounted with respect to the first arm, a lifting actuator connected to the first arm and to the second arm to move the second arm, a connection system connected to the second arm and to the counterweight.

10 Claims, 10 Drawing Sheets

(56) References Cited

U.S. PATENT DOCUMENTS

| | | | | |
|---|---|---|---|---|
| 5,156,215 A | * | 10/1992 | Jensen | B62D 49/085 172/250 |
| 5,598,935 A | * | 2/1997 | Harrison | B62D 49/085 180/69.1 |
| 5,833,268 A | | 11/1998 | Aldrovandi | |
| 6,434,866 B1 | * | 8/2002 | Kawamoto | E02F 9/18 37/466 |
| 7,354,066 B2 | * | 4/2008 | Yamamoto | B62D 49/085 280/759 |
| 7,618,062 B2 | * | 11/2009 | Hamm | B62D 49/085 280/759 |
| 7,669,898 B2 | * | 3/2010 | Hamaguchi | B66C 23/74 280/759 |
| 8,201,849 B2 | * | 6/2012 | Bauer | B62D 49/085 172/611 |
| 9,663,158 B2 | * | 5/2017 | Jutz | B62D 49/0628 |
| 2002/0062586 A1 | | 5/2002 | Kawamoto et al. | |
| 2007/0122261 A1 | | 5/2007 | Hamaguchi et al. | |
| 2015/0097362 A1 | * | 4/2015 | Jutz | B62D 49/0628 280/759 |
| 2017/0051473 A1 | * | 2/2017 | Rutherford | E02F 9/18 |
| 2018/0044150 A1 | * | 2/2018 | Mori | B66C 23/74 |

FOREIGN PATENT DOCUMENTS

| | | | | |
|---|---|---|---|---|
| DE | 102006050126 A1 | * | 5/2008 | A01B 63/1006 |
| DE | 202013105021 U1 | * | 2/2015 | B62D 49/085 |
| GB | 1207857 A | | 10/1970 | |
| JP | 6012062 Y2 | * | 3/1994 | |
| JP | 10195927 A | * | 7/1998 | E02F 9/18 |
| JP | H10195927 A | | 7/1998 | |
| JP | 2797790 B2 | * | 9/1998 | |
| JP | H111940 A | | 1/1999 | |
| JP | 2000120439 A | * | 4/2000 | E02F 9/0866 |
| JP | 2000291070 A | * | 10/2000 | E02F 9/18 |
| JP | 3447633 B2 | * | 9/2003 | |
| JP | 2011246926 A | * | 12/2011 | E02F 9/18 |
| JP | 2013096114 A | * | 5/2013 | E02F 9/18 |
| WO | WO-0221898 A1 | * | 3/2002 | A01B 59/048 |

* cited by examiner

PUBLIC WORKS VEHICLE PROVIDED WITH COUNTERWEIGHT LIFTING SYSTEM

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present patent application for industrial invention relates to a public works vehicle provided with a counterweight lifting system, in particular to a drilling machine or boring machine.

2. Description of Related Art Including Information Disclosed Under 37 CFR 1.97 and 37 CFR 1.98.

In several countries, and especially in the US, the transportation of public works vehicles, such as for instance drilling machines and excavators, is limited according to their weight. Very strict legislation applies to exceptionally large vehicles. In compliance with said strict regulations, a permission must be obtained in order to circulate with such a heavy load like a public works vehicle. The permissions are expensive and must be applied for much in advance. All of the above requires an economic investment and a planning in terms of movements of the public works vehicles, which are not always possible.

In order to reduce the weight of public works vehicles for transportation purposes, some parts of the public works vehicle are usually dismounted. As it is known, many public works vehicles, such as drilling machines and excavators, are provided with a counterweight that prevents the risk of overturning. Since the counterweight is one of the heaviest parts of the vehicle, the counterweight is generally dismounted in such public works vehicles.

Large-sized excavators (with weight higher than 60 tons) provided with counterweight mounting systems, which simplify the mounting and the dismounting operations of the counterweight, are currently known. Said counterweight mounting systems are mounted on the excavator directly by the vehicle manufacturers.

It must be considered that special machines, such as drilling machines, use the base of an excavator as a base. However, since the mobility of drilling machines is reduced compared to excavators, large-sized drilling machines (with weight higher than 60 tons) can advantageously use the base of smaller excavators, i.e. bases that are designed for excavators with weight lower than 60 tons.

Obviously, the bases of the excavators with weight lower than 60 tons are not provided with any counterweight mounting system. Therefore, especially in the case of drilling machines with weight higher than 60 tons, the problem of safely dismounting and mounting the counterweight arises.

A counterweight can be currently connected to an excavator in basically two different ways.

Figure 1:
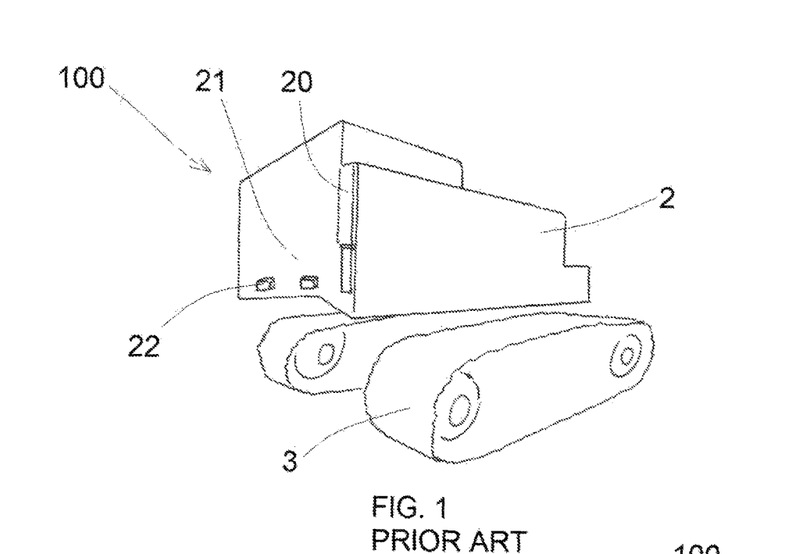
FIG. 1 is a perspective view of an excavator of the prior art, in which the counterweight has been removed.
Figure 2:
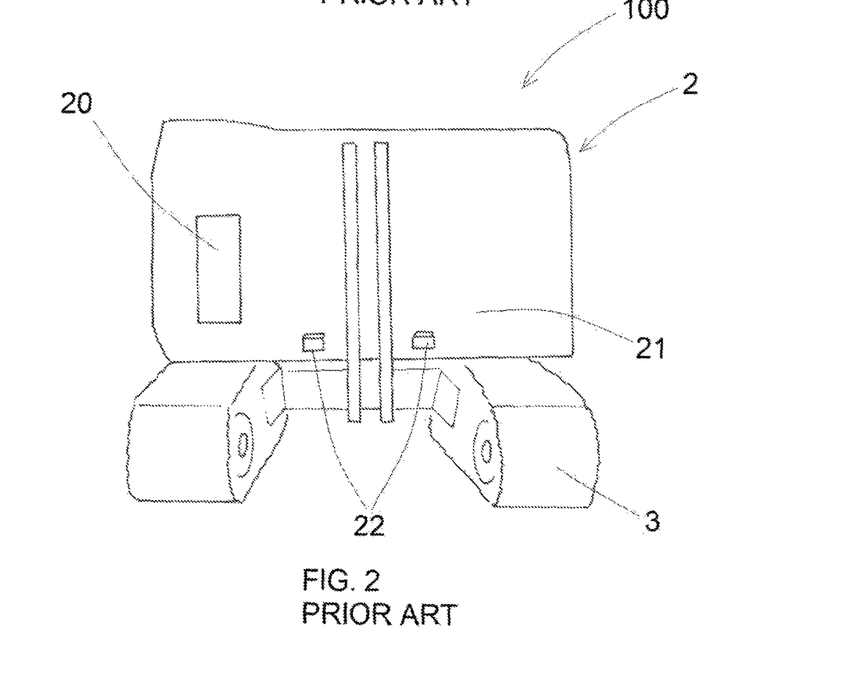
FIG. 2 is a rear view of the excavator of FIG. 1.

FIGS. 1 and 2 show an excavator (100) of the prior art. The excavator (100) has a base (2) supported on moving means (3), such as tracks. The base (2) is intended to house one or more engines of the vehicle. The base (2) has a frame (20) and a wall or back plate (21) fixed to the frame (20). Fastenings (22) intended to anchor a counterweight (not shown in FIGS. 1 and 2) protrude in rearward position from the back wall (21). The fastenings (22) can be fixed or revolvingly mounted in the back wall (21) of the base.

Figure 3:
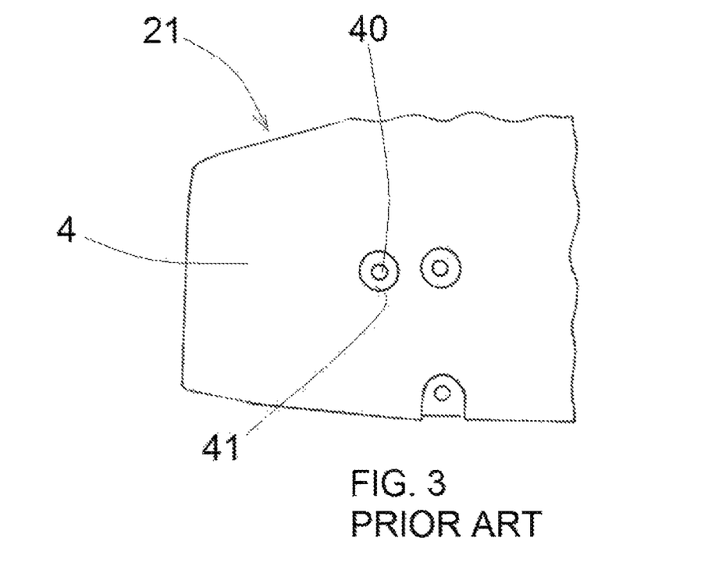
FIGS. 3 and 4 are views of details of the excavator of the prior art shown in FIGS. 1 and 2.

With reference to FIG. 3, a counterweight (4) is positioned on the fastenings (22) and fixing screws (40) are passed through the holes (41) of the counterweight (4) and screwed into threaded holes provided in the back wall (21), in such a way to tighten the counterweight (4) and bring it in contact with the back wall (21) of the base.

Figure 4:
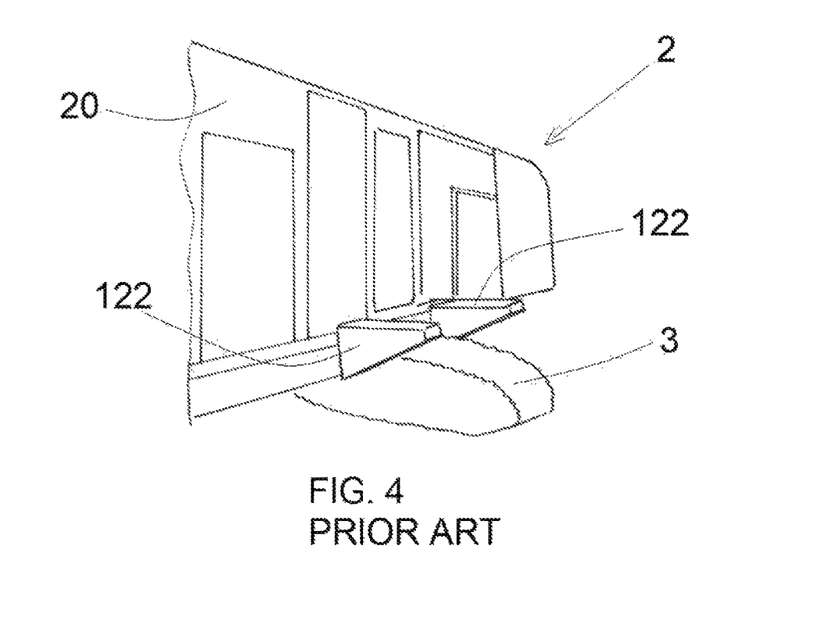

FIG. 4 shows a variant, in which brackets or shelves (122) are provided instead of the fastenings (22), and welded to the frame (20) of the base of the vehicle. The brackets (122) protrude in rearward position from the frame (20) of the base of the vehicle. The counterweight is positioned on the brackets (122) and screws are inserted from down upwards into through holes of the brackets (122) and screwed to the counterweight, in such manner to firmly connect the counterweight to the brackets (122).

In such a case, the mounting and dismounting operations of the counterweight are dangerous because the operator must work under the brackets (122) and therefore under the counterweight.

In order to mount the counterweight, after lifting the counterweight with a lift, the counterweight must be moved closer to the brackets (122). Now the holes of the brackets must be centered with the holes of the counterweight and then the counterweight must be completely lowered. The centering operation must be made by an operator who needs to place himself under the brackets (122) and by an assistant in charge of moving the counterweight while lifted. Evidently, such a centering operation is very dangerous.

Also the dismounting operation of the counterweight is dangerous because the operator must place himself under the brackets (122) in order to loosen the screws.

Today excavator manufacturers do not provide counterweight lifting systems for medium-sized excavators (with weight lower than 60 tons) because the mounting or dismounting operation of the counterweight is very seldom carried out in this type of excavators.

Large-sized excavators (with weight of 60-90 tons) are provided with counterweight lifting systems, without using any additional counterweight lifting machines that are separated from the vehicle, such as for example cranes.

Two types of counterweight lifting systems are currently known on the market, which differ in the type of counterweight fastening.

Figure 5:
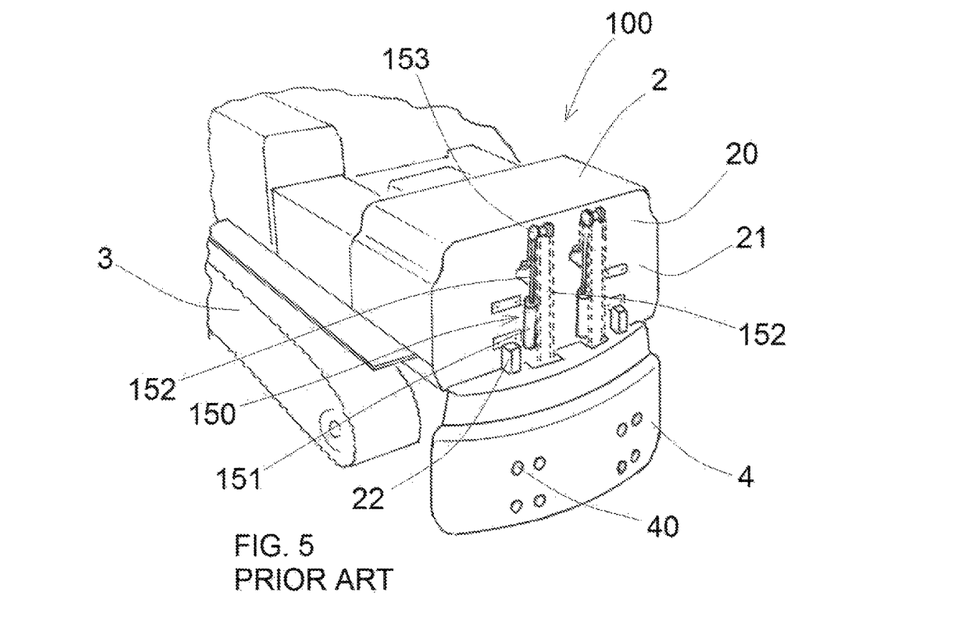
FIG. 5 is a perspective view of an excavator of the prior art, provided with a first type of counterweight lifting system.
Figure 6:
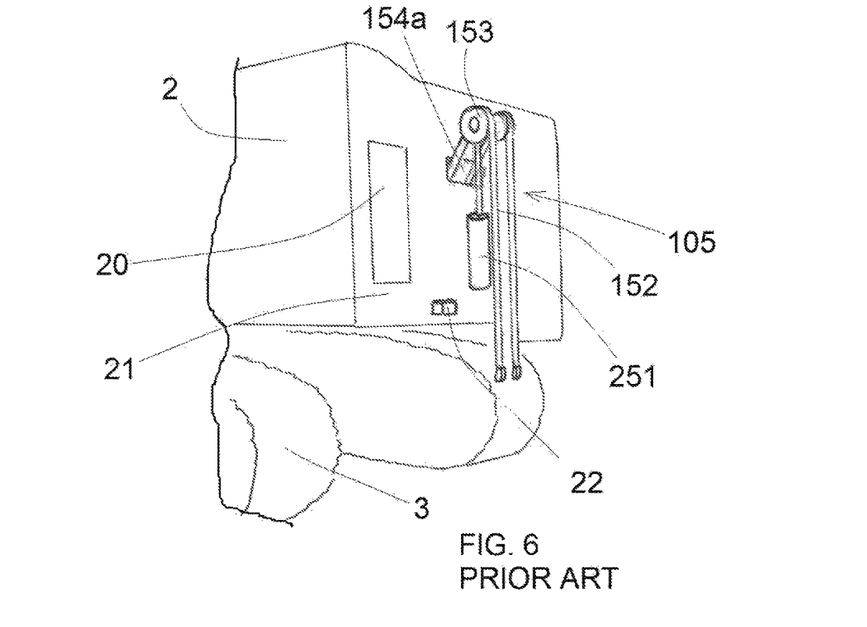
FIG. 6 is a partially interrupted view of the excavator of FIG. 5, in which the counterweight has been removed.

FIGS. 5 and 6 show a first counterweight lifting system, which is generally indicated with reference numeral 105. Such a lifting system (105) comprises one or more hydraulic actuators (150) with vertical axis. The hydraulic actuator (150) comprises a cylinder (151) connected to the frame (20) of the base of the vehicle and a piston (152) that slides in the cylinder. The piston (152) is connected to a toothed wheel (153) by means of a pin that lets the toothed wheel (153) rotate around its axis.

The toothed wheel (153) engages in a chain (154). The chain (154) has a first end (154a) fixed to the frame (20) of the vehicle and a second free end (154b). The counterweight (4) is fixed to the second end (154b) of the chain. When the actuator (150) is actuated, the toothed wheel (153) rotates, pulling the chain (154) that lifts the counterweight (4).

In order to let the counterweight (4) rise, the fastenings (22) are directed in vertical direction, as shown in FIG. 5. When the counterweight (4) is in the correct position, the fastenings (22) must be rotated by 90° and directed in horizontal direction in such a way that the counterweight (4) can be positioned on the fastenings (22). Then, the fixing screws (40) are inserted in the counterweight and screwed in the threaded holes of the back wall (21) of the base. With this system, after lifting the counterweight, an operator needs to direct the fastenings (22) in the correct direction while the counterweight is lifted. This is a potentially dangerous operation.

Moreover, this mounting system with actuator (150) and chains (154) needs a counterweight provided with a space to house the actuator (150) when the counterweight is mounted on the base (2).

Figure 7:
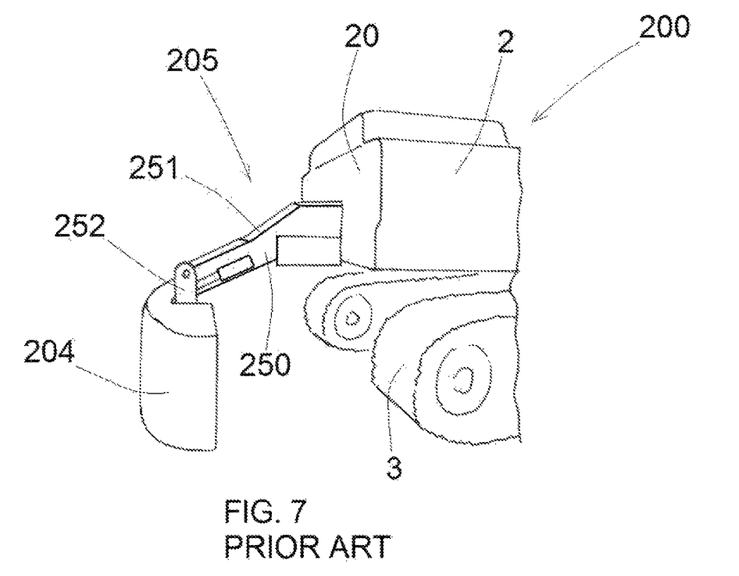
FIG. 7 is a partially interrupted perspective view of an excavator of the prior art, provided with a second type of counterweight lifting system.
Figure 8:
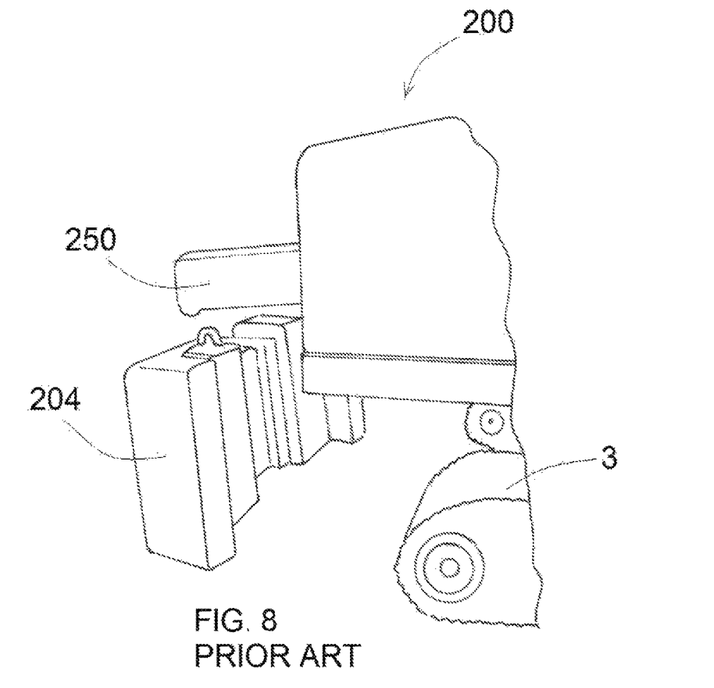
FIG. 8 is a partially interrupted view of the excavator of FIG. 7.

FIGS. 7 and 8 show an excavator (200) provided with a second type of lifting system (205), which consists in an articulated hydraulic system suitable for mounting and dismounting the counterweight. Such a lifting system (205) uses a special counterweight (204) connected to an articulated arm (250). The articulated arm (250) is connected to the frame (20) of the base of the vehicle in an articulated way. The articulated arm (250) is lifted by a hydraulic cylinder (251).

The articulated arm (250) is connected to the counterweight (204) by means of connecting rods or bars (252). In case of systems with supporting shelves or brackets, after lifting the counterweight (204), the counterweight (204) needs to be centered with respect to the brackets, when the counterweight is in a dangerous condition, meaning that the counterweight is not supported by the brackets of the frame and is not fixed to the brackets with screws.

The counterweight lifting systems of this type, which are currently available on the market, require to modify both the vehicle and the counterweight, the latter having to be suitable for housing the connecting rods (252) and/or the articulated arm. In any case, such articulated hydraulic systems are very expensive.

Other variants of the counterweight lifting systems are known, which consist in articulated hydraulic systems, in which, after mounting the counterweight, the counterweight protrudes in upper position with respect to the hood of the vehicle engine. Such a characteristic of the protruding position of the counterweight with respect to the hood is not a problem for excavators, but represents a serious problem for drilling machines.

Figure 9:
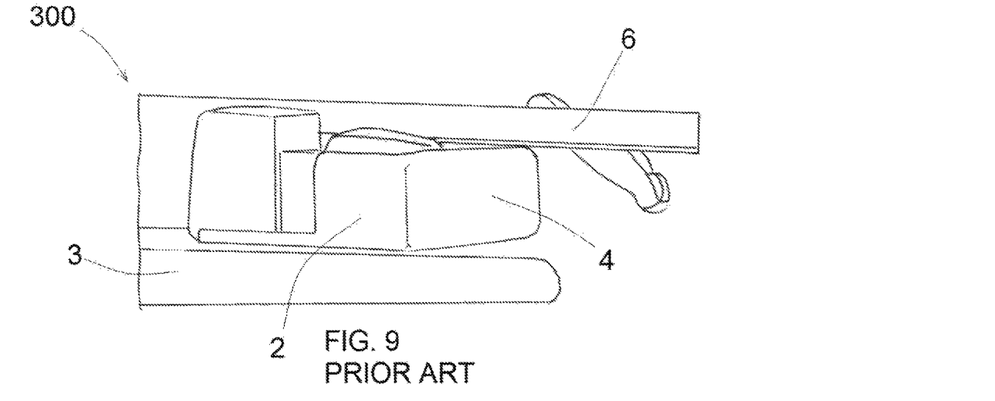
FIG. 9 is a perspective view of a drilling machine of the prior art, in idle condition.
Figure 10:
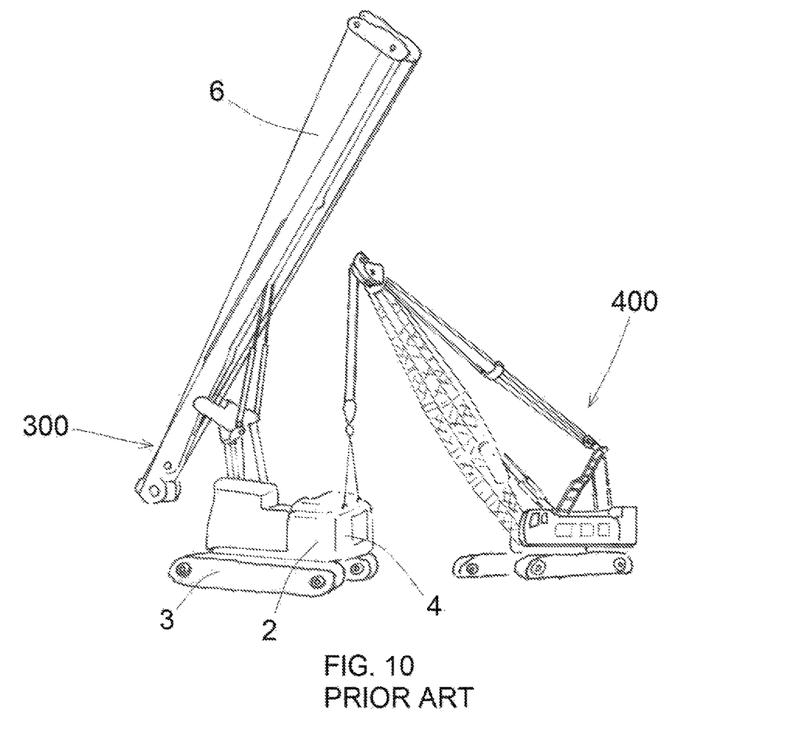
FIG. 10 is a perspective view of the drilling machine of FIG. 9, in working condition, and of a crane used to lift the counterweight.

With reference to FIGS. 9 and 10, a drilling or boring machine (300) comprises a base (2) mounted on moving means (3), such as tracks. A mast (6) is mounted in an articulated way on the base (2) and a counterweight (4) is fixed to the base (2) in rearward position. A slide slides on the mast (6) and transmits torque and thrust to a drilling tool. As it is known, the mast (6) is a very long shaft, with at least triple length than the base (2). In idle or transportation condition (FIG. 9), the mast is disposed horizontally and protrudes from the base (2) in rearward position, being disposed on the counterweight (4). In working condition (FIG. 10) the mast (6) is raised upwards, and disposed practically vertically.

Currently, the drilling machines that use the base of an ordinary excavator as a base are not provided with counterweight mounting systems. Therefore, the counterweight is mounted with the help of another lifting machine, such as for example a crane (400).

However, the following problems are encountered when using either a crane or one of the known counterweight mounting systems as described above:

when a drilling machine (300) is in idle or transportation condition (FIG. 9), the mast (6) protrudes from the base of the machine in rearward position, above the counterweight (4), making it difficult to dismount the counterweight, given the fact that the mast (6) is disposed between the counterweight and the crane. In view of the above, in order to dismount the counterweight (4) easily, it would be necessary to put the machine in working condition, with the mast (6) raised upwards (see FIG. 10). However, in such a working configuration, the center of gravity of the machine is moved forward, thus reducing the stability of the machine.

In drilling machines for posts, when the drilling machine is in transportation condition, the mast (6) is disposed horizontally on the machine and must be as close as possible to the counterweight (4) in order to reduce the total height of the machine. In fact, any protruding element above the counterweight (4) could increase the total height of the drilling machine.

The use of the counterweight mounting systems of the prior art would require the modification of the counterweight (4) to make space for an articulated arm or for a hydraulic actuator. Such an operation would be rather difficult and expensive, because the counterweight is generally filled with concrete reinforced with metal scrap, and covered with a thin sheet metal with a thickness of a few millimeters.

Other types of counterweight consist in a cast iron block and therefore also this type of counterweight is difficult to modify.

Moreover, either using the crane (400) or a counterweight mounting system of the prior art, the operator is exposed to a potential hazard both when centering the holes of the counterweight and when rotating the threads of the fastenings for the counterweight.

US2002/00625 discloses a counterweight lifting system that comprises two telescopic arms. Each telescopic arm comprises an internal tube that slides inside an external tube by means of an actuator.

The two external tubes are hinged at the base of the machine. The two external tubes are connected by a plate. An actuator actuates on the plate in a way that the external tubes rotate around the hinging axes.

The internal tubes are perfectly straight. The ends of the internal tubes are connected to a shaft with pulleys around which ropes that are fastened to the counterweight slide.

Such a telescopic arm system protrudes in rearward position from the base of the machine. Consequently, the counterweight cannot be a standard counterweight composed of a parallelepiped block, but must be a special counterweight that is frontally provided with a recessed housing to house the telescopic arms. Therefore, the lifting device of US2002/00625 cannot be used with standard counterweights that are not provided with a suitable housing to house the lifting system.

The purpose of the present invention is to eliminate the drawbacks of the prior art by providing a public works vehicle provided with a counterweight lifting system that is effective, reliable, safe, practical, inexpensive, simple to use and install.

Another purpose of the present invention is to provide a public works vehicle provided with a lifting system that is suitable for being applied to a standard counterweight that is normally used in excavators.

BRIEF SUMMARY OF THE INVENTION

These purposes are achieved by the present invention with the characteristics of the independent claim 1.

Advantageous embodiments appear from the dependent claims.

The present invention has been devised starting from the following remarks:
- drilling machine manufacturers use standard excavators with standard counterweights;
- for excavators with maximum weight of 60 tons manufacturers do not provide any counterweight lifting systems because the weight of the counterweight does not create any transportation problems;
- because of the presence of frontal equipment that is heavier than the excavator arms, the weight of the drilling machines with excavator bases exceeds the excavator weight by approximately 30%; therefore, it is necessary to dismount the standard counterweight to reduce transportation problems.

The problem of mounting and dismounting the standard counterweight has been solved according to the present invention:
- by extending the support brackets of the counterweight in order to receive the counterweight lifting system (such an extension is also made to move the counterweight backward, thus increasing the stability of the drilling machine without increasing its total weight);
- with a counterweight lifting system that is able to mount the standard counterweight of an excavator, lifting and placing it in a correct position, on the counterweight supports, or to dismount and place it on the ground or on a means of transportation.

The public works vehicle of the invention comprises:
- a base containing at least one engine, said base comprising a frame and a substantially vertical back wall;
- moving means supporting the base;
- at least one bracket joined to the frame;
- a counterweight intended to be fixed and supported by said at least one bracket; and
- a lifting system intended to lift said counterweight.

The lifting system comprises:
- a first arm hinged to said frame to go from a retracted position, wherein the first arm is disposed vertically near the back wall of the base, to an extracted position, wherein the first arm protrudes from the back wall of the base;
- at least one thrust actuator connected to the frame and to the first arm to move the first arm;
- a second arm slidingly mounted with respect to the first arm to go from a retracted position, with respect to the first arm, to an extracted position, wherein it protrudes from the first arm;
- a lifting actuator connected to the first arm and to the second arm to move the second arm; and
- a connection system connected to the second arm and to the counterweight.

In particular, the second arm has an eccentric shape, i.e. a non-linear shape. The second arm comprises a rearward protruding end portion. Such an end portion has a shaft whereon the connection system is hinged.

The distance between the external surface of the first arm and an axis parallel to the axis of the first arm and passing through the pivoting axis of the end portion of the second arm is higher than the distance between the center of gravity of the counterweight and the front surface of the counterweight.

The eccentric configuration of the second arm allows for lifting the counterweight vertically, in such a way that the counterweight volume does not hinder the lifting system.

BRIEF DESCRIPTION OF THE SEVERAL VIEWS OF THE DRAWINGS

Additional features of the invention will appear clearer from the detailed description below, which refers to merely illustrative, not limiting embodiments, wherein.

DETAILED DESCRIPTION OF THE INVENTION

With reference to FIGS. 11-15, a public works vehicle (1), according to the invention, such as a drilling or a boring machine, is disclosed.

The public works vehicle (1) comprises a base (2) mounted on moving means (3), such as tracks. The base (2) has a frame (20) and a substantially vertical back wall (21). The base (2) houses one or more engines of the vehicle, which are closed by a hood (25) that protrude in upper position from the base (2).

The public works vehicle (1) comprises a counterweight (4) and a lifting system (5) to lift and support the counterweight (4). The lifting system (5) is mounted in the frame (20) of the base, in such a way to protrude in rearward position from the back wall (21) of the base.

Figure 11:
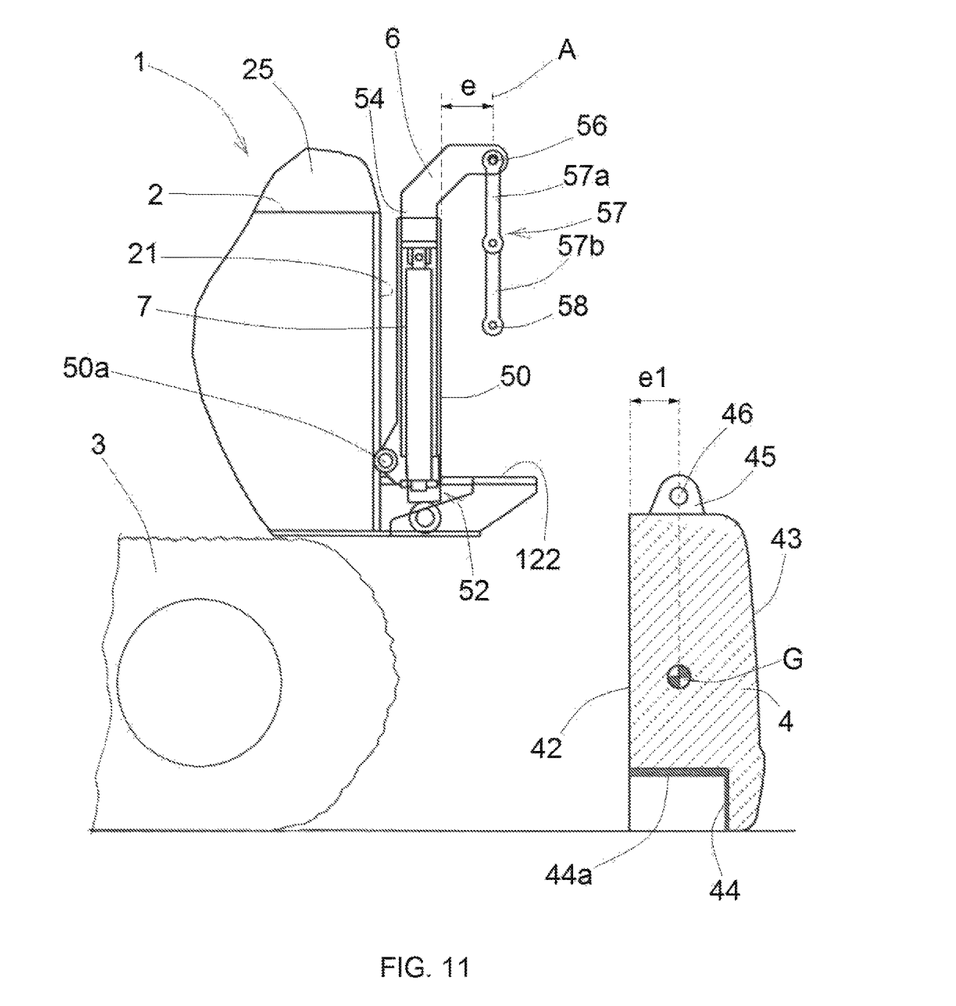
FIG. 11 is a partially interrupted sectional view of a public works vehicle with counterweight lifting system according to the invention, in which the counterweight is placed on the ground and disconnected from the lifting system.

With reference to FIG. 11, the counterweight (4) is a standard counterweight of the type that is normally used in excavators. The counterweight (4) has a parallelepiped body comprising a substantially planar and vertical front wall (42) and a back wall (43). The counterweight (4) has a lower seat (44) that is frontally open and provided with a planar horizontal surface (44a).

The counterweight (4) has a center of gravity (G). Two flanges (45) protrude in upper position from the counterweight. The flanges (45) have holes (46) with horizontal axis intersecting a vertical axis passing through the center of gravity (G). A distance (e1) is defined between the center of gravity (G) and the front wall (42) of the counterweight.

With reference to FIGS. 11-15, the public works vehicle (1) comprises two brackets (122) joined to the frame (20) and protruding in rearward position from the back wall. The brackets (122) are suitable for supporting the counterweight (4).

Instead of two brackets (122), a single bracket can be used, which is shorter than the brackets (122) shown in FIGS. 11-16. In such a case, the counterweight (4) can be positioned at a higher distance and height, that is in the center of a trolley.

Figure 16:
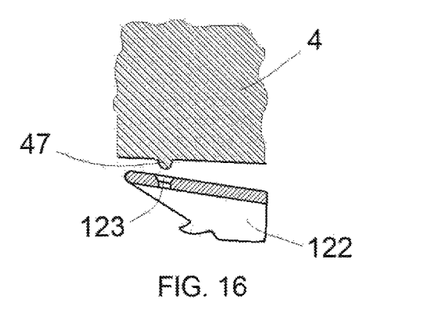
FIG. 16 is a sectional view of a lower portion of the counterweight and of a bracket of the frame of the public works vehicle.

With reference to FIG. 16, the counterweight (4) comprises centering pins (47) that protrude in lower position from the counterweight to be engaged in centering housings (123) obtained in the brackets (122). Advantageously, the centering pins (47) of the counterweight have a truncated-conical shape and the centering housings (123) of the brackets have a tapered or flared shape.

The lifting system (5) comprises a first arm (50); advantageously, the first arm is an internally empty female arm. The first arm (50) is hinged to the frame (20) of the base of the vehicle, in a pivoting axis (50a) disposed in a central position of the back wall (21) of the base of the vehicle, between the two brackets (122). The length of the brackets (122) has been expressly increased with respect to the brackets of the prior art in order to create a housing for the first arm (50).

The pivoting axis (50a) of the first arm (50) is a horizontal axis, in parallel position with respect to the back wall (21) of the base. In view of the above, the first arm (50) can rotate around its pivoting axis to pass from a retracted position, in which the first arm is arm is disposed vertically near the back wall (21) of the base, to an extracted position, in which the first arm protrudes in rearward position from the back wall (21) of the base and is tilted with respect to the back wall (21), At least one thrust actuator (51) controls the movement of the first arm (50). Two thrust actuators (51) of hydraulic type are preferably used, being disposed on two opposite sides of the first arm. Each thrust actuator (51) comprises a cylinder (52) connected to the frame (20) of the base of the vehicle and a piston (53) connected to a flange (59) that protrudes in lateral position from the first arm (50).

A second arm (54) is slidingly mounted with respect to the first arm (50), in telescopic coupling mode. Advantageously, the second arm (54) is a male arm that slides inside the first arm, which is a female arm, but, obviously, likewise, the first arm can be a male arm and the second arm can be a female arm.

The second arm (54) can go from an extracted position inside the first arm to an extracted position in which it protrudes in upper position from the first arm, A lifting actuator (7), preferably of hydraulic type, is mounted inside the first arm (50) to control the movement of the second arm (54). The lifting actuator (7) comprises a cylinder (70) connected to the first arm (50) and a piston (71) connected to the second arm (54).

Actuation levers (not shown) are arranged in the back left-hand portion of the base (2) (in safety position with respect to the counterweight (4)). The actuation levers actuate the thrust actuators (51) and the lifting actuator (7).

The second arm (54) has an eccentric shape, i.e. a non-linear shape. The second arm (54) comprises a rearward protruding end portion (6). The end portion (6) is tilted or curved with respect to the longitudinal axis of the second arm that corresponds to the sliding axis of the second arm inside the first arm.

A shaft (56) is mounted in the end portion (6) of the second arm (54), with horizontal axis in parallel position to the plane of the back wall (21).

Connection means (57) are connected to the shaft (56). The connection means (57) of the lifting system (5) preferably comprise two articulated arms, but can also consist in ropes or actuators. Each articulated arm of the connection means (57) comprises a first connecting rod (57a) hinged to the shaft (56) and a second connecting rod (57b) hinged to the first connecting rod (57a).

One end of the second connecting rod (57b) is provided with a pin (58). In this way, the pin (58) of the second connecting rod of the lifting system can be engaged inside the hole (46) of the flanges (45) of the counterweight.

Obviously, a rod can be inserted between the two flanges (45) of the counterweight and the connection means (57) are connected to said rod to lift the counterweight.

With reference to FIG. 11, the end portion (6) is dimensioned in such a way that the distance (e) between the external surface of the first arm (50) and an axis (A) parallel to the axis of the first arm and passing through the axis of the shaft (56) is higher than the distance (e1) between the center of gravity (G) of the counterweight (4) and the front surface (42) of the counterweight. As a matter of fact, when lifting and lowering the counterweight, the axes of the holes (46) of the flanges (45) of the counterweight and the shaft (56) of the end portion (6) of the second arm intersect a vertical axis passing through the center of gravity (G) of the counterweight.

In this way, given that the distance (e) is higher than the distance (e1), the front wall (42) of the counterweight does not interfere with the external surface of the first arm (50).

This description continues illustrating the operation of the lifting system (5).

The counterweight (4) is connected to the articulated arms of the connection means (57) by inserting the pins (58) of the second connecting rods inside the holes (46) of the flanges of the counterweight, when the counterweight is safely positioned on the ground.

Figure 12:
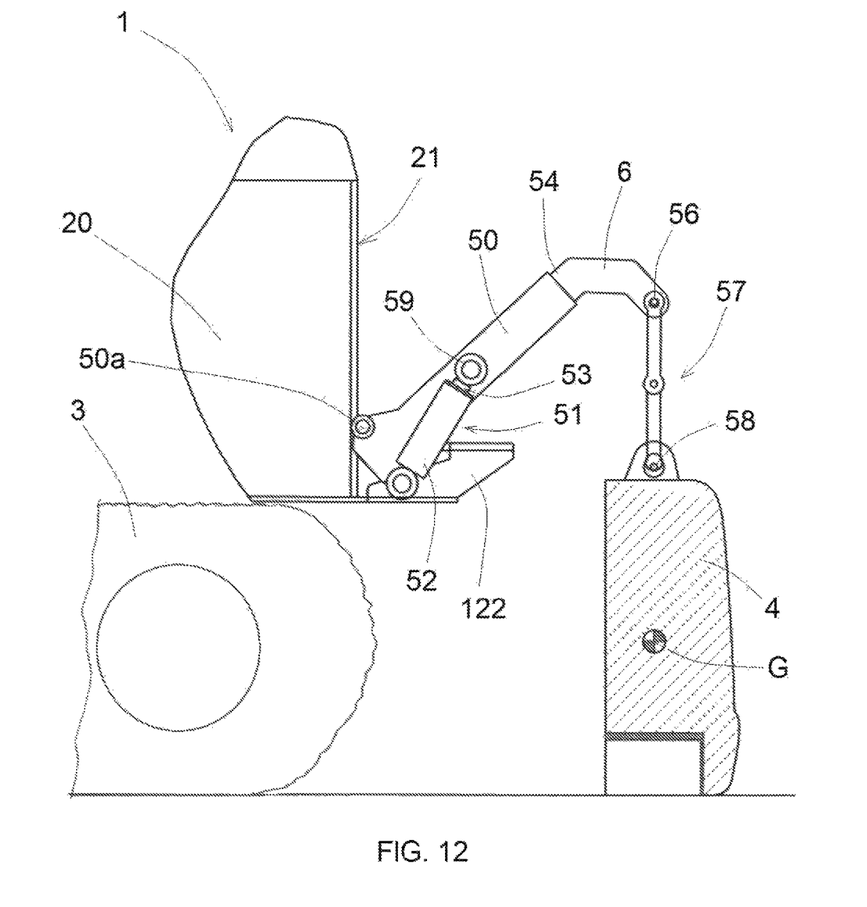
FIG. 12 is a side view of the vehicle of FIG. 11, in which the counterweight is lifted and connected to the lifting system, in an initial lifting step.
Figure 13:
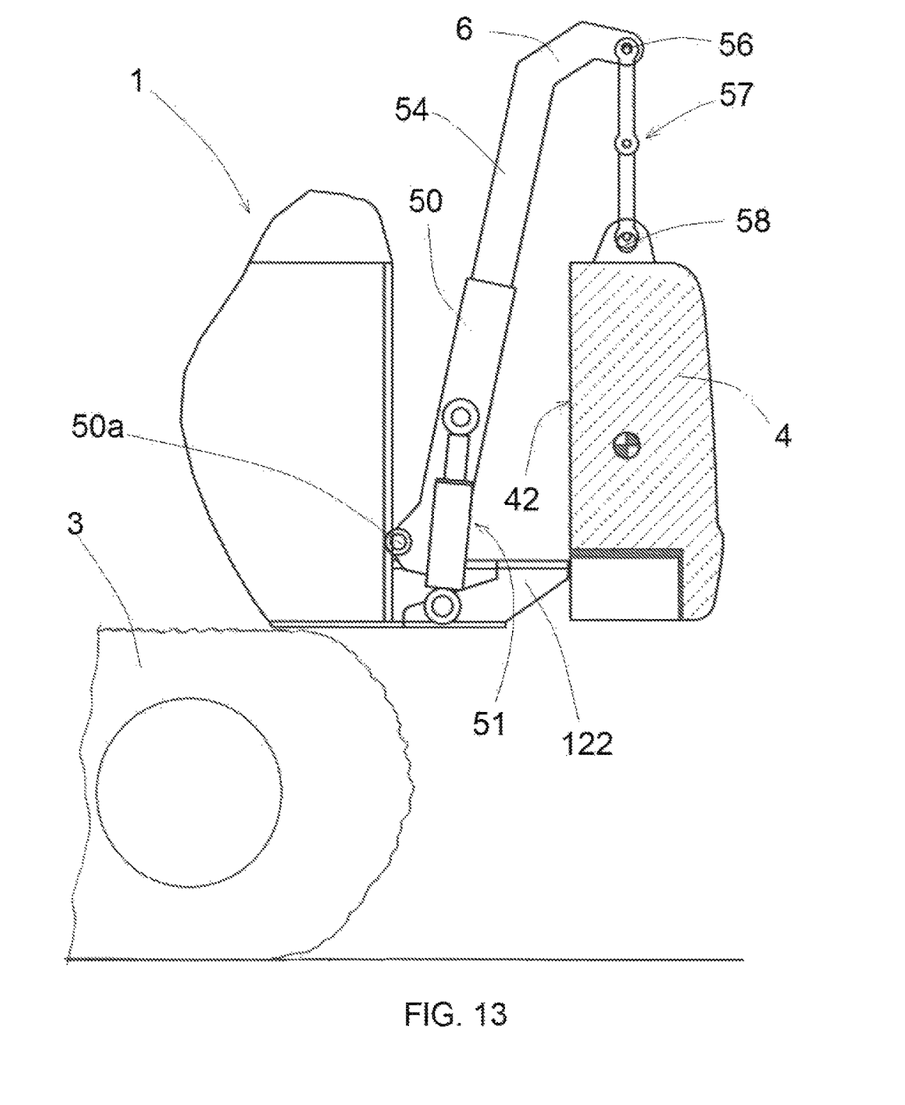
FIG. 13 is the same view as FIG. 12, wherein the counterweight is moved closer to the support brackets.
Figure 14:
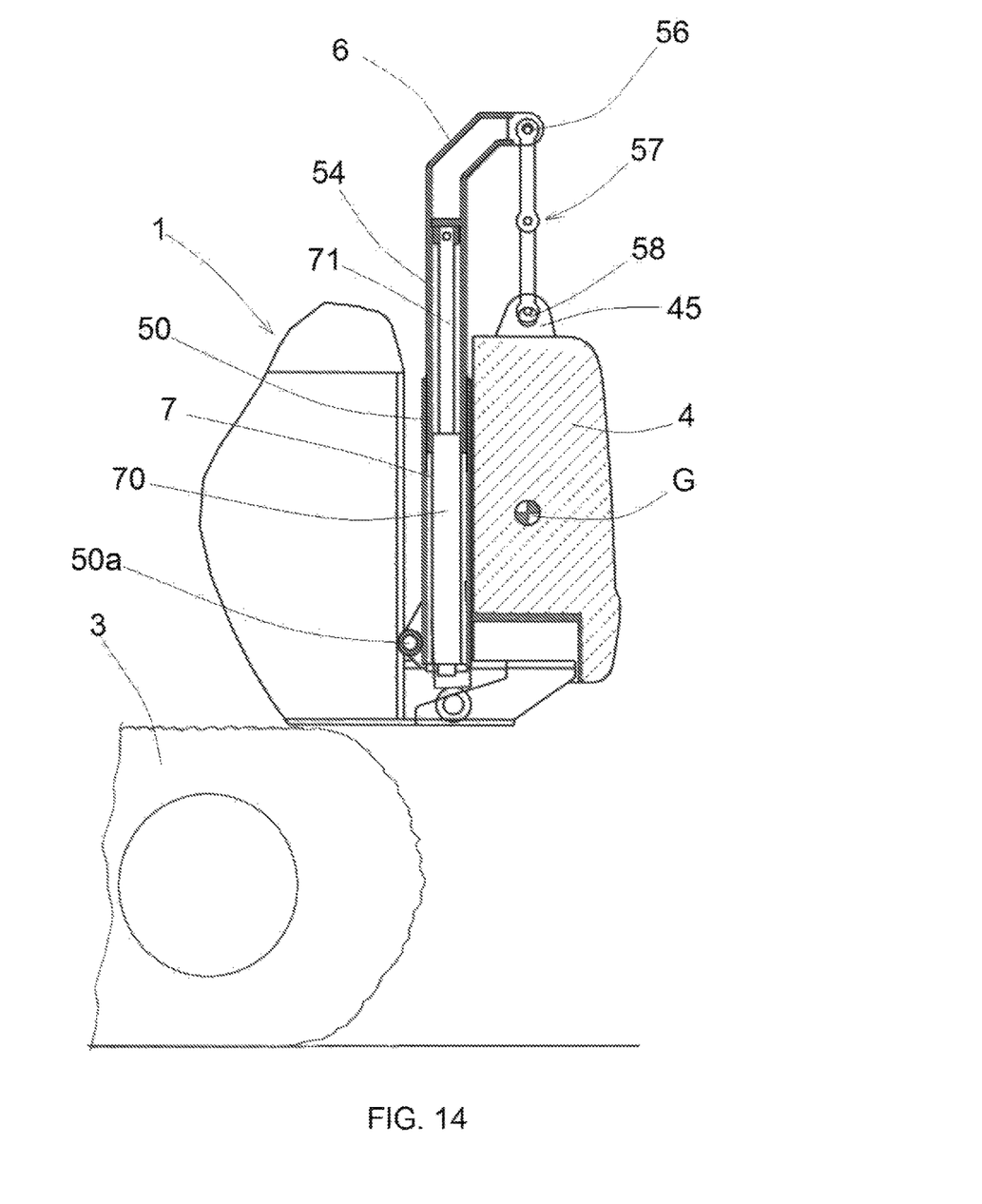
FIG. 14 is a sectional view of the vehicle of the invention, in which the counterweight is positioned above the support brackets.

Successively, the operator actuates the actuation levers that control the movement of the lifting actuator (7) and of the thrust actuators (51) to lift the counterweight (4). The counterweight (4) is positioned above the brackets (122) by combining the movement of the lifting actuator (7) and of the thrust actuators (51). When the counterweight (4) is above the brackets (122), but not in contact yet with the brackets, the second arm (54) is lowered by closing the lifting actuator (51), thus lowering the counterweight (4).

Before the counterweight (4) comes in contact with the brackets (122), the centering pins (47) of the counterweight are engaged inside the centering housings (123) of the brackets, centering the counterweight with respect to the brackets, without the need for the operator to place himself under the brackets.

Figure 15:
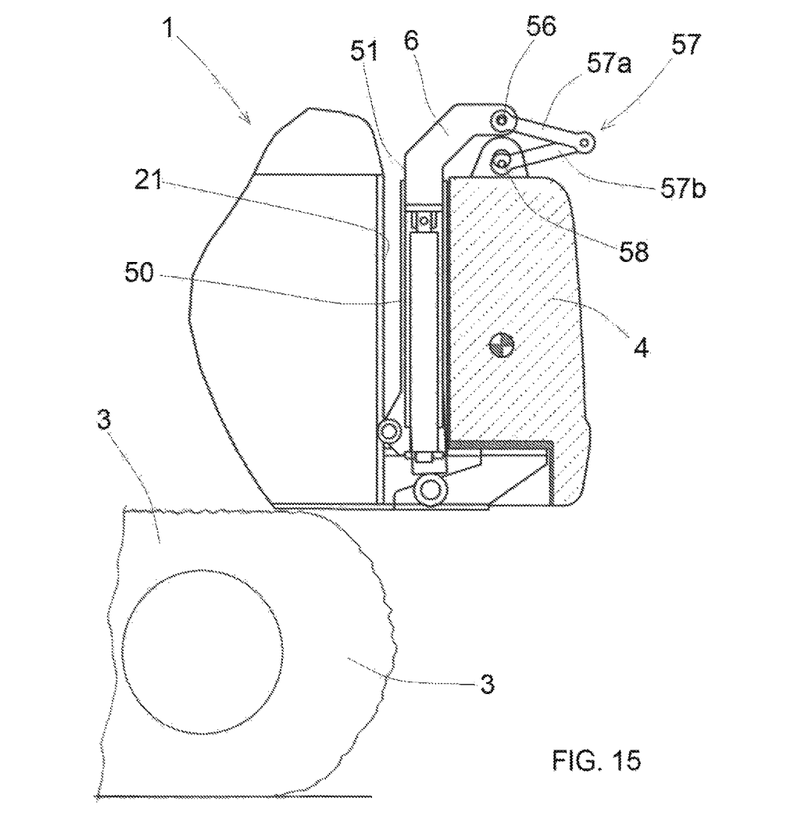
FIG. 15 is the same view as FIG. 14, in which the counterweight is supported by the support brackets.

When the counterweight (4) is positioned on the brackets (122), but not yet disconnected from the lifting system (5), the fixing screws are inserted under the brackets (122) to fix the counterweight (4) to the brackets (122). Now the lifting actuator (7) is closed completely in such a way to bring the second arm (54) to a retracted position at a lower height than the hood (25) of the vehicle.

The lifting system (5) has the following advantages:

Such a lifting system (5) is completely folded under the hood (25) of the engine in such a way not to increase the height of the public works vehicle (1) when the public works vehicle (1) is in transport configuration.

Such a lifting system (5) uses a standard counterweight (4), just like the counterweights used in excavators; therefore, it is not necessary to make expensive modifications on the counterweight or to obtain a suitable housing on the brackets (122) of the frame of the public works vehicle.

Such a lifting system (5) allows the operator to work in total safety because, when fixing the counterweight to the brackets by means of fixing screws, the counterweight (4) is positioned on the brackets and the lifting system is connected to the counterweight.

Several equivalent variations and modifications can be made to the present embodiments of the invention, which are within the reach of an expert of the field, falling in any case within the scope of the invention.

I claim:

1. Public works vehicle comprising:
   a base containing at least one engine, said base comprising a frame and a substantially vertical back wall;
   moving means supporting the base;
   at least one bracket joined to the frame;
   a counterweight having a front wall intended to be faced towards said back wall of the base; said counterweight being intended to be fixed and supported by said brackets;
   a lifting system intended to lift said counterweight;
   wherein said lifting system comprises:
   a first arm hinged to said frame to go from a retracted position, wherein the first arm is disposed vertically near the back wall of the base, to an extracted position, wherein the first arm protrudes from the back wall of the base;
   at least one thrust actuator connected to the frame and to the first arm to move the first arm;
   a second arm slidingly mounted with respect to the first arm to go from a retracted position with respect to the first arm to an extracted position, wherein it protrudes from the first arm;
   a lifting actuator connected to the first arm and to the second arm to move the second arm;
   a connection system connected to the second arm and to the counterweight
   wherein the second arm has an eccentric shape, that is a non-linear shape; the second arm comprises a rearward-protruding end portion; said end portion of the second arm has a shaft and the connection system is hinged to said shaft;
   the distance between the external surface of the first arm and an axis parallel to the axis of the first arm and passing through the axis of the shaft of the end portion of the second arm is higher than the distance between the center of gravity of the counterweight and the front wall of the counterweight.

2. The public works vehicle of claim 1, wherein said shaft is disposed along a horizontal axis parallel to the back part and said connection system comprises articulated arms or ropes or actuators connected to said shaft and to said counterweight.

3. The public works vehicle of claim 2, wherein said connection system comprises an articulated arm comprising a first connecting rod hinged to said shaft and a second connecting rod hinged to the first connecting-rod.

4. The public works vehicle of claim 3, wherein said second connecting rod comprises a pin that is engaged in a hole of a flange that protrudes in upper position from the counterweight.

5. The public works vehicle of claim 1, comprising two thrust actuators disposed on opposite sides of said first arm.

6. The public works vehicle of claim 1, wherein said at least one thrust actuator and said lifting actuator are hydraulic actuators.

7. The public works vehicle of claim 6, wherein said at least one thrust actuator comprises a cylinder connected to the frame of the public works vehicle and a piston connected to said first arm.

8. The public works vehicle of claim 1, wherein said brackets protrude from the back wall of the base in such manner to generate a housing that receives said first arm.

9. The public works vehicle of claim 1, wherein said counterweight has centering pins that protrude in lower position from the counterweight and are engaged in centering housings obtained in said brackets.

10. The public works vehicle of claim 1, wherein said public works vehicle is a drilling machine or a boring machine.

* * * * *

UNITED STATES PATENT AND TRADEMARK OFFICE
CERTIFICATE OF CORRECTION

PATENT NO. : 10,066,365 B2
APPLICATION NO. : 15/411507
DATED : September 4, 2018
INVENTOR(S) : Giuseppe Cartechini It is certified that error appears in the above-identified patent and that said Letters Patent is hereby corrected as shown below:

In the Claims

Column 9, Line 35, remove Claim 1 and insert the following claim:
--1. Public works vehicle comprising:
a base containing at least one engine, said base comprising a frame and a substantially vertical back wall;
moving means supporting the base;
at least one bracket joined to the frame;
a counterweight having a front wall intended to be faced towards said back wall of the base; said counterweight being intended to be fixed and supported by said brackets;
a lifting system intended to lift said counterweight;
wherein said lifting system comprises:
    a first arm hinged to said frame to go from a retracted position, wherein the first arm is disposed vertically near the back wall of the base, to an extracted position, wherein the first arm protrudes from the back wall of the base;
    at least one thrust actuator connected to the frame and to the first arm to move the first arm;
    a second arm slidingly mounted with respect to the first arm to go from a retracted position with respect to the first arm to an extracted position, wherein it protrudes from the first arm;
    a lifting actuator connected to the first arm and to the second arm to move the second arm;
    a connection system connected to the second arm and to the counterweight;
    wherein the second arm comprises a rearward-protruding end portion that is tilted or curved with respect to a longitudinal axis of said second arm corresponding to a sliding axis of said second arm inside said first arm; said end portion of the second arm has a shaft and the connection system is hinged to said shaft;
    the distance between the external surface of the first arm and an axis parallel to the axis of the first arm and passing through the axis of the shaft of the end portion of the second arm is higher than the distance between the center of gravity of the counterweight and the front wall of the counterweight.--

Signed and Sealed this
Seventh Day of July, 2020

Andrei Iancu
*Director of the United States Patent and Trademark Office*